United States Patent
Zaks

(10) Patent No.: US 8,792,421 B2
(45) Date of Patent: Jul. 29, 2014

(54) IDLE CONNECTION STATE POWER CONSUMPTION REDUCTION IN A WIRELESS LOCAL AREA NETWORK USING BEACON DELAY ADVERTISEMENT

(75) Inventor: Artur Zaks, Modiin (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/044,085

(22) Filed: Mar. 9, 2011

(65) Prior Publication Data
US 2011/0158216 A1 Jun. 30, 2011

Related U.S. Application Data

(62) Division of application No. 11/971,716, filed on Jan. 9, 2008, now Pat. No. 7,920,535.

(60) Provisional application No. 60/885,138, filed on Jan. 16, 2007.

(51) Int. Cl.
*H04W 4/00* (2009.01)

(52) U.S. Cl.
USPC .......................................... 370/328

(58) Field of Classification Search
USPC .............. 370/328, 310, 310.2, 338, 431, 445, 370/447, 448, 449
See application file for complete search history.

(56) References Cited

U.S. PATENT DOCUMENTS

| | | | |
|---|---|---|---|
| 6,580,700 B1 * | 6/2003 | Pinard et al. | 370/332 |
| 7,151,945 B2 | 12/2006 | Myles et al. | |
| 7,245,946 B2 | 7/2007 | Liu | |
| 7,248,600 B2 * | 7/2007 | Benveniste | 370/445 |
| 7,295,827 B2 | 11/2007 | Liu et al. | |
| 8,099,047 B2 * | 1/2012 | David et al. | 455/41.2 |
| 2005/0233789 A1 | 10/2005 | Maekawa | |
| 2006/0171341 A1 | 8/2006 | Wang et al. | |
| 2007/0014269 A1 | 1/2007 | Sherman et al. | |
| 2007/0093201 A1 | 4/2007 | Hsu et al. | |

* cited by examiner

*Primary Examiner* — Ahn Ngoc Nguyen
(74) *Attorney, Agent, or Firm* — Ronald O. Neerings; Wade James Brady; Frederick J. Telecky, Jr.

(57) ABSTRACT

A novel and useful apparatus for and method of Improving idle connection state power consumption in wireless local area network (WLAN) system. Beacon transmission delay information is determined by the access points and advertised to the stations via a Beacon Transmission Delay Information Element. In response, the stations adjust their Wake For Beacon Reception time accordingly to wake up at a time much closer to the actual receipt of the Beacon, thereby reducing power consumption due to the reduced time the receive circuits need to be powered on.

15 Claims, 10 Drawing Sheets

IDLE CONNECTION STATE POWER CONSUMPTION REDUCTION IN A WIRELESS LOCAL AREA NETWORK USING BEACON DELAY ADVERTISEMENT

REFERENCE TO PRIORITY APPLICATION

This application is a Divisional of application Ser. No. 11/971,316 filed Jan. 9, 2008, now U.S. Pat. No. 7,920,535 which claims priority to U.S. Provisional Application Ser. No. 60/885,138, filed Jan. 16, 2007, entitled "Power Consumption in Idle Connection State", incorporated herein by reference in its entirety.

FIELD OF THE INVENTION

The present invention relates to the field of data communications and more particularly relates to an apparatus for and method of improving idle connection state power consumption in wireless local area network (WLAN) systems using beacon delay advertisements.

BACKGROUND OF THE INVENTION

Wireless Local Area Networks (WLANs) are well known in the art. Over the past few years, wireless networking has exploded with numerous products commercially available from a myriad of manufacturers. The standards governing WLAN networking products are defined by a suite of specifications issued by the IEEE and known as the IEEE 802.11 standard, incorporated herein by reference in their entirety. The standards define the operation of both the radio PHY layer and the MAC layer.

A wireless local area network (WLAN) links two or more computers together without using wires. WLAN networks utilize spread-spectrum technology based, on radio waves to enable communication between devices in a limited area, also known as the basic service set. This gives users the mobility to move around within a broad coverage area and still be connected to the network.

For the home user, wireless networking has become popular due to the ease of installation and location freedom with the large gain in popularity of laptops. For the business user, public businesses such as coffee shops or malls have begun to offer wireless access to their customers, whereas some are even provided as a free service. In addition, relatively large wireless network projects are being constructed in many major cities.

There are currently there exist several standards for WLANs: 802.11, 802.11a, 802.11b, 802.11g and 802.11n. The 802.11b has a rate of 11 Mbps in the 2.4 GHz band and implements direct sequence spread spectrum (DSSS) modulation. The 802.11a is capable of reaching 54 Mbps in the 5 GHz band. The 802.11g standard also has a rate of 54 Mbps but is compatible with 802.11b. The 802.11a/g implements orthogonal frequency division multiplexing (OFDM) modulation.

A WLAN state is any component that can connect into a wireless medium, in a network. All stations are equipped with wireless network interface cards (NICs) and are either access points or clients. Access points (APs) are base stations for the wireless network. They transmit and receive radio frequencies for wireless enabled devices to communicate with. Wireless clients can be mobile devices such as laptops, personal digital assistants, IP phones or fixed devices such as desktops and workstations that are equipped with a wireless network interface card.

The basic service set (BSS) is defined as the set of all stations that can communicate with each other. There are two types of BSS: (1) independent BSS and (2) infrastructure BSS. Every BSS has an identification (ID) called the BSSID, which is the MAC address of the access point servicing the BSS. An independent basic service set (BSS) is an ad-hoc network that contains no access points, which means the stations within the ad-hoc network cannot connect to any other basic service set.

A network diagram illustrating an example prior art. WLAN network is shown in FIG. 1. The example network, generally referenced 10, comprises WLAN access points 26, 32 (AP) coupled to a wired LAN 22 such as an Ethernet network. The WLAN AP 26 in combination with laptops 28 form basic service group (BSS) #1 24. Similarly, WLAN AP 32 in combination with laptop 34, personal digital assistant (PDA) 36 and cellphone 38, form basic service group #2 30. A server 12, desktop computers 14, 16, router 20 and Internet 18 are also connected to the wired LAN 22.

A block diagram illustrating an example prior art WLAN transceiver in more detail is shown in FIG. 2. The WLAN transceiver, generally referenced 40, comprises antennas 42, 44, RF switch. 46, I and Q signal analog to digital converters (ADCs) 58, 60, respectively, I and Q signal digital to analog converters (DACs) 61, 62, respectively, baseband processor PHY/MAC 69, EEPROM 63, static RAM 64, FLASH memory 65, host interface (I/F) 66 coupled to host 67 and power management circuit 68. Radio circuit 48 comprises bandpass filter 50, RF front end circuitry 52, bandpass filter 54 and I/Q transceiver 56 that performs I and Q modulation and demodulation.

A timing synchronization function (TSF) is operative to keep the timers of all the stations (STAs) in the same basic service set (BSS) synchronized. Each station maintains its own local TSF timer. In a conventional WLAN infrastructure network, the access point (AP) is the timing master and is operative to implement the timing synchronization function (TSF). The AP periodically transmits special frames called beacons that contain a copy of its TSF timer. The beacons are used by the other STAs in the BSS to synchronize to the AP. A STA always accepts the timing information received in a beacon from the AP servicing its BSS. If the TSF tinier of a STA is different from the timestamp in the received beacon, the receiving STA sets its local timer to the received timestamp value.

For ad hoc networks, the TSF in an Independent BSS (IBSS) is implemented using a distributed algorithm that is performed by the members of the BSS. Each STA in the BSS transmits beacons in accordance with an algorithm defined in the 802.11 standard. Each STA in the IBSS adopts the timing received from any beacon or probe response that has a TSF value later than its own TSF timer. STAs expect to receive beacons at a nominal rate. The interval between beacon transmissions is defined by the aBeaconPeriod parameter of the STA. A STA sending a beacon sets the value of the timestamp to be equal to the value of the TSF timer of the STA at the time that the first bit of the timestamp is transmitted to the PHY plus the transmitting delays of the STA through its local PHY from the MAC-PHY interface to its interface with the wireless medium (i.e. antenna, etc.).

An infrastructure basic service set (BSS) can communicate with other stations that are not in the same basic service set by communicating through access points. An extended service set (ESS) is a set of connected BSSs. Access points in an ESS are connected by a distribution system. Each ESS has an ID called the SSID which is a 32-byte (maximum) character string. A distribution system connects access points in an extended service set. A distribution system is usually a wired LAN but can also be a wireless LAN.

In infrastructure networks, the AP defines the timing for the entire BSS by transmitting beacons in accordance with the aBeaconPeriod attribute within the AP. This define a series of target beacon transmission times (TBTTs) exactly aBeaconPeriod time units apart. Time zero is defined to be a TBTT with the beacon being a delivery traffic indication message (DTIM) and transmitted at the beginning of a contention fee period (CFP). At each TBTT, the AP schedules a beacon as the next frame for transmission. If the carrier sense mechanism determines that the medium is busy, the AP delays the actual transmission of the beacon in accordance with the basic medium access defined in the standard. The beacon period is adopted, by all STAs when joining the BSS. A block diagram illustrating an example beacon transmission in a busy network is shown in FIG. 3.

Beacon generation in an IBSS ad hoc network is a distributed process. The beacon period is included in Beacon and Probe Response frames and STAs adopt that beacon period when joining the IBSS. All members of the IBSS participate in beacon generation. Each STA maintains its own TSF timer that is used, for aBeaconPeriod timing. The beacon interval within an IBSS is established b the STA that instantiates the IBSS. This defines a series of TBTTs exactly aBeaconPeriod time units apart. Time zero is defined to be a TBTT. At each TBTT the STA (1) suspends the decrementing of the backoff timer for any pending non-beacon or non-ad hoc traffic indication (ATM) transmission; (2) calculates a random delay uniformly distributed in the range between zero and twice aCWmin×aSlotTime; (3) waits for the period of the random delay, decrementing the random delay tinier using the same algorithm as for backoff; (4) cancels the remaining random delay and the pending beacon transmission, if a beacon arrives before the random delay timer expires, and the ATM backoff timer resumes decrementing; and (5) sends a beacon if the random delay timer expires and no beacon has arrived during the delay period.

Note that in an infrastructure network, the STAs always adopt the timer in a beacon or probe response from the AP in their BSS. In an IBSS, a STA always adopts the information in the contents of the beacon or probe response when it contains a matching service set identifier (SSID) and the value of the timestamp is later than the TSF timer of the STA (i.e. it adopts the timing of the fastest clock in the network).

The types of wireless LANs include peer to peer or ad-hoc wireless LANs. A peer-to-peer (P2P) WLAN enables wireless devices to communicate directly with each other. Wireless devices within range of each other can discover and communicate directly without involving central access points. This method is typically used by two computers so that they can connect to each other to form a network. If a signal strength meter is used in this situation, it may not read the strength accurately and can be misleading, because it registers the strength of the strongest signal, which, may be the closest computer.

The RF front end circuit 20 functions to filter and amplify RF signals and perform RF to IF conversion to generate I and Q data signals for the ADCs 26, 28 and DACs 30, 32. The baseband processor 34 is a part of the PHY that functions to modulate and demodulate I and Q data and carrier sensing, transmission and receiving of frames. The medium access controller (MAC) functions to control the communications (i.e. access) between the host device and applications. The power management circuit 44 is adapted to receive power via a wall adapter, battery and/or power via the host interface 42. The host interface may comprise PCI, CardBus or USB interfaces.

A problem associated with WLAN transceivers, however, is that their power consumption is a limiting factor in their deployment in mobile networks, WLAN transceivers consume relatively large amounts of power for the following reason. Wireless LAN transceivers are designed to serve computers throughout a structure with uninterrupted service using radio frequencies. Due to the wide bandwidth used, the relatively high SNR required to demodulate the higher order WLAN constellations (64 QAM) and the possibility for strong adjacent channel signals, the transceiver has to sample incoming signals at very high frequency (e.g., 4× or higher then actual bandwidth) using high accuracy ADCs and highly linear receiver chains, all of which consume high power.

In the majority of mobile use cases, a large percent of the time, the mobile WLAN device is operating in the 'idle' receive mode. In this mode, the WLAN device is searching for and waiting to receive valid packets either from an access point (AP) or other stations (i.e. ad-hoc network). For active voice connections, the WLAN device is in the idle mode approximately 20-90% of the time, approximately 20-50% for standby operation and approximately 90% for scan operations.

While in the idle connection state, the STA is connected to the AP but very little traffic flows, e.g., a packet is sent every few seconds. In this case, the STA is still required to wake up on DTIM/Listen intervals to perform the following various activities: (1) receive broadcast traffic, including NetBIOS name requests, ARP requests, UPnP advertisements, etc; (2) checking for unicast traffic destined for the STA, including incoming call, application protocol messages, key updates, etc.; (3) perform management actions, including updating timing synchronization function (TSF) values, tracking dynamic frequency selection (DPS) (channel switch announcements); and (4) performing RX path calibrations.

Most, of the above actions require the STA to wake up and receive beacon messages and process information received in the beacon message. A block diagram illustrating the multi-phase process of Beacon reception in a STA is shown in FIG. 4. Beacon reception and related processing are performed in three phases. In Phase 1 (block 162), the STA wakes up before the target beacon transmit time (TBIT) event to prepare for reception of the beacon. This phase comprises executing the wake-up sequence (block 164); switching on the RX chain (block 166); and waiting for the arrival of the beacon message (block 168).

In Phase 2 (block 170), the STA receives the beacon message. The beacon is transmitted with some delay that is inherent to the design of the AP. The delay, however, is not known by the STA and may be hardware or software based. Further, the beacon is transmitted at the lowest rate (e.g., 1 Mbps) to ensure reception with low SNR.

In Phase 3 (block 172), the receive beacon message is processed. This phase comprises switching off the RX chain (block 174); processing the contents of the beacon message (block 176); and executing the doze command (block 178).

Standard WLAN implementations typically suffer from relatively high idle power consumption (over 10% of the power consumed during active reception). This is because for idle mode operation they use the standard radio receive circuit path which has relatively high, power consumption associated with it. The majority of the power consumption occurs in the front end circuit, ADC circuits and the high speed digital correlator logic circuits. Thus, considering the above described usage patterns, idle power consumption constitutes the dominant part of the power budget. In particular, maximal power consumption occurs while the RX chain is on.

It is thus desirable to have a mechanism that is capable of reducing or minimizing the power consumed while WLAN transceiver devices are in the idle connection, state searching for WLAN beacon messages, signals, etc. In particular, optimization of the power consumption during the idle connection state can significantly reduce the overall power consumption of WLAN devices, improve standby and talk battery times and permit a wider deployment in mobile devices.

SUMMARY OF THE INVENTION

The present invention is a novel and useful apparatus for and method of improving idle connection state power consumption in wireless local area network (WLAN) systems. The present invention provides a mechanism for reducing the power consumption of stations (STAs) in a WLAN network while in the Idle connection state.

Although the mechanism of the present invention can be used in numerous types of communication systems, to aid in illustrating me principles of the present invention, the description of the WLAN signal detection mechanism is provided in the context of a WLAN radio co-located with a Bluetooth radio that is part of a cellular phone.

In operation, mechanism determines the Beacon transmission delay inherent in its implementation. This delay is implementation specific and will vary from device to device and from manufacturer to manufacturer. The delay can be determined at the time of manufacture by the device vendor. The Beacon transmission delay information is advertised by the access point to the stations via a special Beacon Transmission Delay Information Element. The stations, upon receipt, adjust their Wake For Beacon Reception time accordingly so that they wake up at a time much closer to the actual receipt of the Beacon, thus reducing power consumption due to the reduce time the receive circuits need to be on.

In addition, the mechanism takes advantage of the fact that not all the contents of Beacon messages change from one Beacon to the next. Thus, stations only need receive the variable portion of the Beacon that changes. Access points determine the size of the variable portion of their Beacon messages and include this size information in a special Variable Beacon Data Information Element in the Beacon message itself. The station reads the contents of this information element and uses the size information to determine at what point it can halt the reception of the Beacon message and turn off it's receive radio thereby saving power.

Although the WLAN idle connection state power reduction mechanism of the present invention can be incorporated in numerous types of communication devices such a multimedia player, cellular phone, PDA, mobile device, etc., it is described in the context of a WLAN access point and station, it is appreciated, however, that the invention is not limited to the example applications presented, whereas one skilled in the art can apply the principles of the invention to other communication systems as well without departing from the scope of the invention.

The WLAN signal detection mechanism has several advantages including the following: (1) use of She mechanism of the present invention provides for a significant reduction in power consumption during the WLAN idle mode of operation which translates to over 300% of power savings for common usage scenarios of standby operation and 10% of power saving for voice call in the enterprise environment and over 200% of power savings for common usage scenarios of standby operation and 4% of power saving for voice call in the home environment; (2) depending on the particular implementation, implementing the invention does not require additional hardware; and (3) depending on the particular implementation, the mechanism requires only software modifications to access points and stations.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application. Specific Integrated Circuit (ASIC) or Field Programmable Gate Array (FPGA), or as functionally equivalent discrete hardware components.

There is thus provided in accordance with the invention, a method for use in an access point in a wireless local area network (WLAN) system, the method comprising the steps of measuring beacon transmission delay on the access point and advertising the measured beacon transmission delay in beacon messages thereby permitting recipient stations to schedule wake up times for beacon reception with significantly improved accuracy.

There is also provided in accordance with the invention, a method for use in an access point in a wireless local area network (WLAN) system, the method comprising the steps of measuring beacon transmission delay on the access point from a target beacon transmission time (TBTT) event to the time a beacon packet is forwarded to a channel access function and advertising the measured beacon transmission delay in beacon messages thereby permitting recipient stations to schedule wake up times for beacon reception with better accuracy.

There is further provided in accordance with the invention, a method for use in an access point in a wireless local area network (WLAN) system, the method comprising the steps of determining a delay in transmission of beacons beyond a time normally required for channel access and advertising the measured beacon transmission delay in beacon messages thereby permitting recipient stations to schedule wake up times for beacon reception with better accuracy.

There is also provided in accordance with the invention, a method for use in a station in a wireless local area network (WLAN) system, the method comprising the steps of receiving a beacon message containing beacon transmission delay information transmitted by an access point and updating a wake for beacon reception time value in accordance with the beacon transmission delay information.

There is further provided in accordance with the invention, a mobile communication device comprising a cellular radio, a WLAN radio, a processor coupled to the WLAN radio and the cellular radio, the processor operative to receive a beacon message containing beacon transmission delay information transmitted by an access point and update a wake for beacon reception time value in accordance with the beacon transmission delay information.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
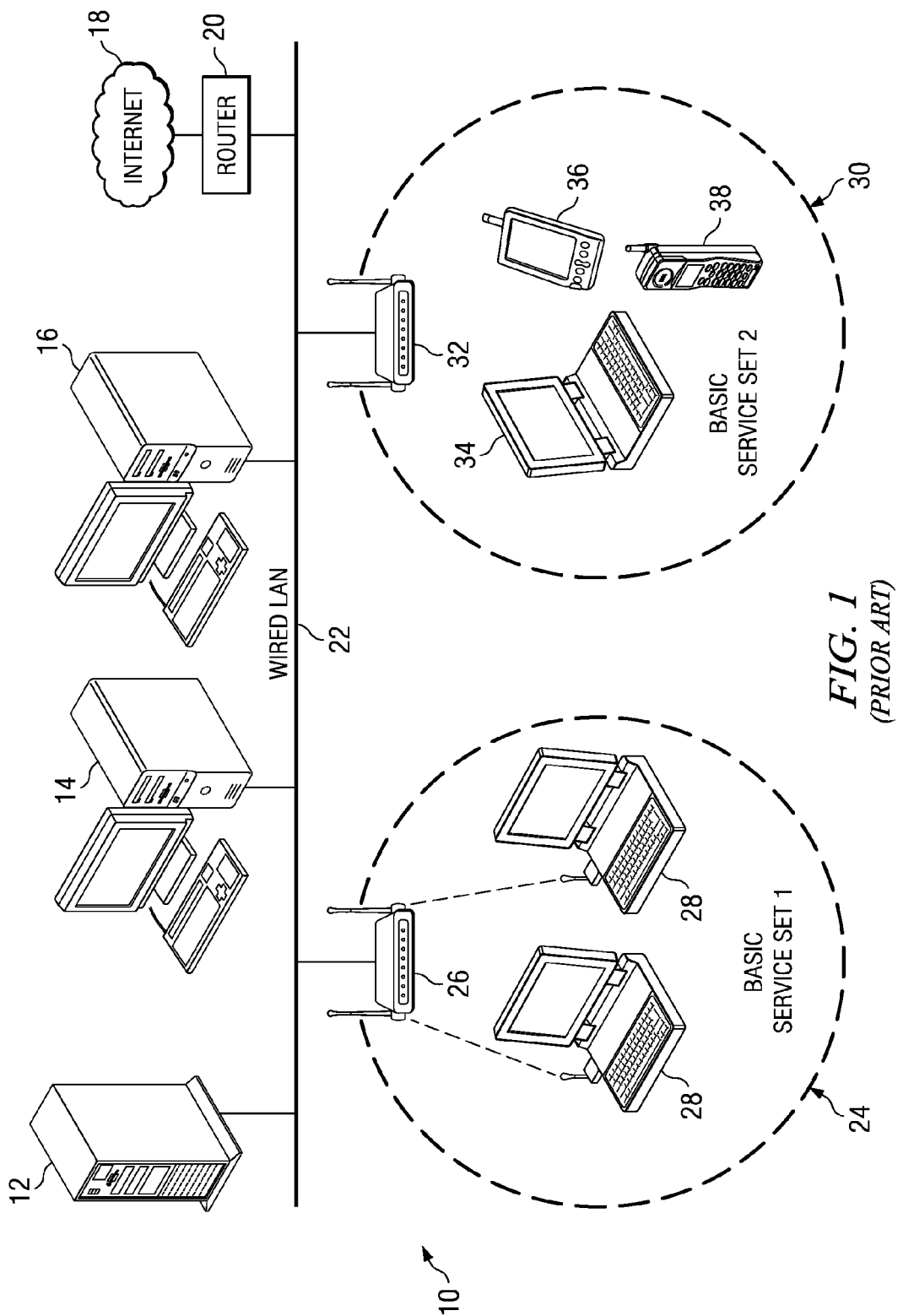
FIG. 1 is a network diagram illustrating an example prior art WLAN network.
Figure 2:
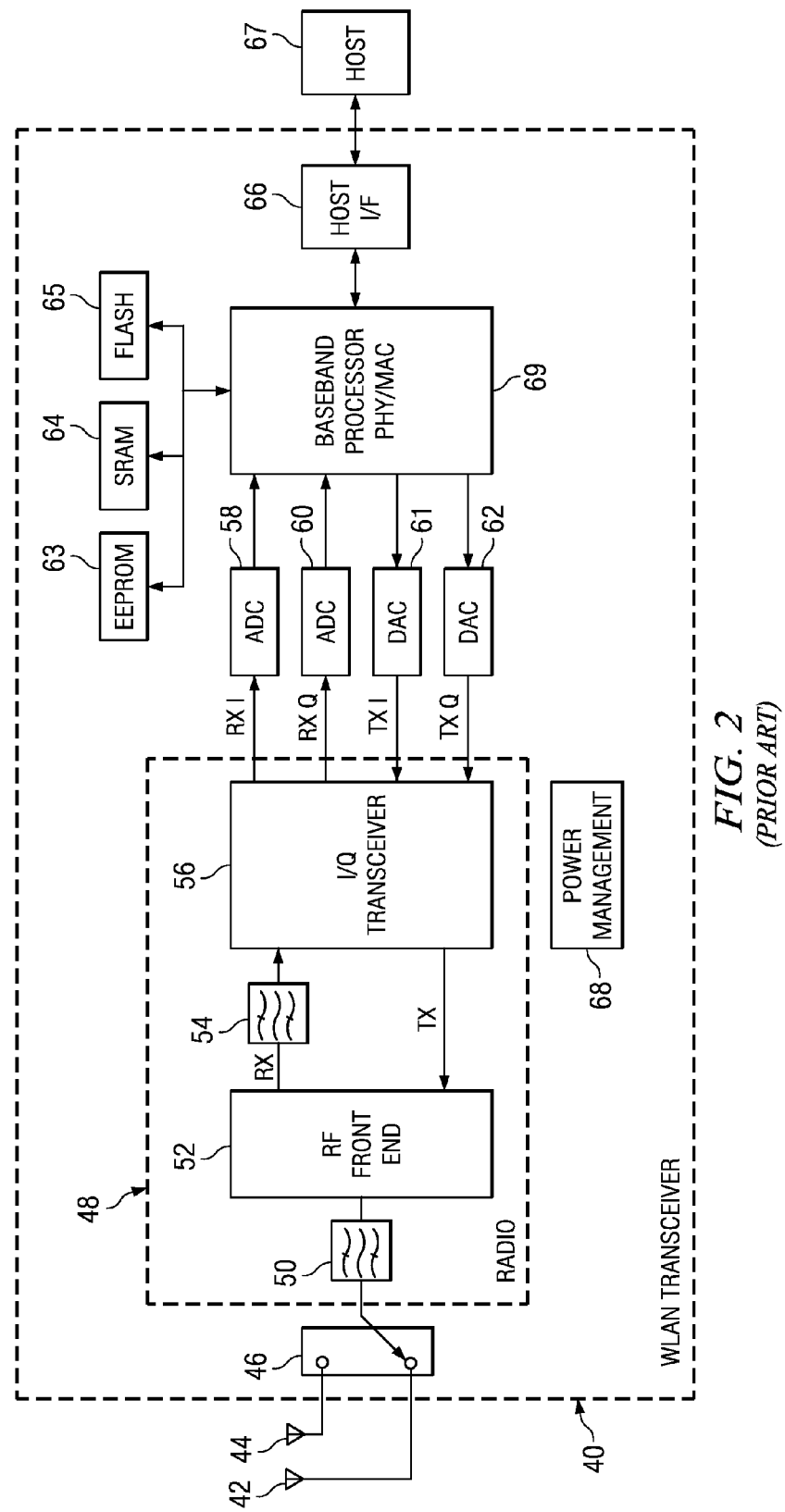
FIG. 2 is a block diagram illustrating an example prior art WLAN transceiver in more detail.

The following notation is used throughout this document,

| Term | Definition |
| --- | --- |
| AC | Alternating Current |
| ADC | Analog to Digital Converter |
| AP | Access Point |
| ASIC | Application Specific Integrated Circuit |
| ATIM | Ad Hoc Traffic Indication |
| AVI | Audio Video Interleave |
| BMP | Windows Bitmap |
| BSS | Basic Service Set |
| BTD | Beacon Transmission Delay |
| CCK | Complementary Code Keying |
| CFP | Contention Fee Period |
| CPU | Central Processing Unit |
| DAC | Digital to Analog Converter |
| DC | Direct Current |
| DFS | Dynamic Frequency Selection |
| DRAM | Dynamic Random Access Memory |
| DS | Direct Sequence |
| DSP | Digital Signal Processor |
| DSSS | Direct Sequence Spread Spectrum |
| DTIM | Delivery Traffic Indication Message |
| EDCA | Enhanced Distributed Channel Access |
| EDR | Enhanced Data Rate |
| EPROM | Erasable Programmable Read Only Memory |
| ERP | Extended Rate Physical |
| ESS | Extended Service Set |
| FCS | Frame Check Sequence |
| FM | Frequency Modulation |
| FPGA | Field Programmable Gate Array |
| GPS | Ground Positioning Satellite |
| HDL | Hardware Description Language |
| HT | High Throughput |

-continued

| Term | Definition |
| --- | --- |
| IANA | Internet Assigned Numbers Authority |
| IBSS | Independent Basic Service Set |
| ID | Identification |
| IE | Information Element |
| IEEE | Institute of Electrical and Electronics Engineers |
| IF | Intermediate Frequency |
| IP | Internet Protocol |
| JPG | Joint Photographic Experts Group |
| LAN | Local Area Network |
| LBTD | Last Beacon Transmission Delay |
| MAC | Media Access Control |
| MBOA | Multiband OFDM Alliance |
| MP3 | MPEG-1 Audio Layer 3 |
| MPG | Moving Picture Experts Group |
| NIC | Network Interface Card |
| OFDM | Orthogonal Frequency Division Multiplexing |
| OSI | Open Systems Interconnection |
| PC | Personal Computer |
| PCI | Personal Computer Interconnect |
| PDA | Portable Digital Assistant |
| QAM | Quadrature Amplitude Modulation |
| RAM | Random Access Memory |
| RF | Radio Frequency |
| ROM | Read Only Memory |
| SDIO | Secure Digital Input Output |
| SIM | Subscriber Identity Module |
| SNR | Signal to Noise Ratio |
| SRAM | Static Random Access Memory |
| SSID | Service Set Identifier |
| STA | Station |
| TBTT | Target Beacon Transmission Times |
| TSF | Timing Synchronization Function |
| TV | Television |
| UPnP | Universal Plug and Play |
| USB | Universal Serial Bus |
| UWB | Ultra Wideband |
| WiFi | Wireless Fidelity |
| WiMAX | Worldwide Interoperability for Microwave Access |
| WiMedia | Radio platform for UWB |
| WLAN | Wireless Local Area Network |
| WMA | Windows Media Audio |
| WMV | Windows Media Video |
| WPAN | Wireless Personal Area Network |

DETAILED DESCRIPTION OF THE INVENTION

The present invention is a novel and useful apparatus for and method of improving idle connection state power consumption in wireless local area network (WLAN) systems. The present invention provides a mechanism for reducing the power consumption of stations (STAs) in a WLAN network while in the Idle connection state.

Although the mechanism of the present invention can be used in numerous types of communication systems, to aid in illustrating the principles of the present invention, the description of the WLAN signal detection mechanism is provided in the context of & WLAN radio co-located with a Bluetooth radio that is part of a cellular phone.

Although the WLAN idle connection state power reduction mechanism of the present invention can be incorporated in numerous types of communication devices such a multimedia player, cellular phone, PDA, mobile device, etc., it Is described in the context of a WLAN access point and station. It Is appreciated, however, that the invention is not limited to the example applications presented, whereas one skilled in the art can apply the principles of the invention to other communication systems as well without departing from the scope of the invention.

Note that throughout this document, the term communications device is defined as any apparatus or mechanism adapted to transmit, receive or transmit and receive data through a medium. The term communications transceiver or communications device is defined as any apparatus or mechanism adapted to transmit and receive data through a medium. The communications device or communications transceiver may be adapted to communicate over any suitable medium, including wireless or wired media. Examples of wireless media include RF, infrared, optical, microwave, UWB, Bluetooth, WiMax, WiMedia, WiFi, or any other broadband medium, etc. Examples of wired media include twisted pair, coaxial, optical fiber, any wired interface (e.g., USB, Firewire, Ethernet, etc). The term Ethernet network is defined as a network compatible with any of the IEEE 802.3 Ethernet standards, including but not limited to 10Base-T, 100Base-T or 1000Base-T over shielded or unshielded twisted pair wiring. The terms communications channel, link and cable are used interchangeably.

The term multimedia player or device is defined as any apparatus having a display screen and user input means that is capable of playing audio (e.g., MPS, WMA, etc.), video (AVI, MPG, WMV, etc.) and/or pictures (JPG, BMP, etc.). The user input means is typically formed of one or more manually operated switches, buttons, wheels or other user input means. Examples of multimedia devices include pocket sized personal digital assistants (PDAs), personal media player/recorders, cellular telephones, handheld devices, and the like.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention can take the form of an entirely hardware embodiment, an entirely software embodiment or an embodiment containing a combination of hardware and software elements. In one embodiment, a portion of the mechanism of the invention is implemented in software, which includes but is not limited to firmware, resident software, object code, assembly code, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium is any apparatus that can contain, store, communicate, propagate, or transport the program for use by or in connection with the instruction execution system, apparatus, or device, e.g., floppy disks, removable hard drives, computer files comprising source code or object code, flash semiconductor memory (USB flash drives, etc.), ROM, EPROM, or other semiconductor memory devices.

Mobile Device/Cellular Phone/PDA System

Figure 3:
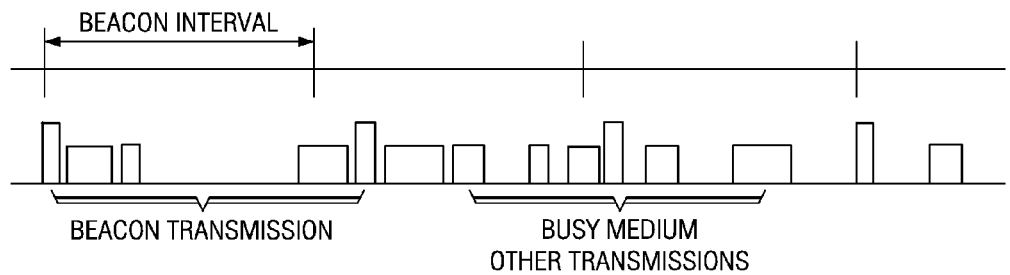
FIG. 3 is a block diagram illustrating beacon transmission in a busy network.
Figure 4:
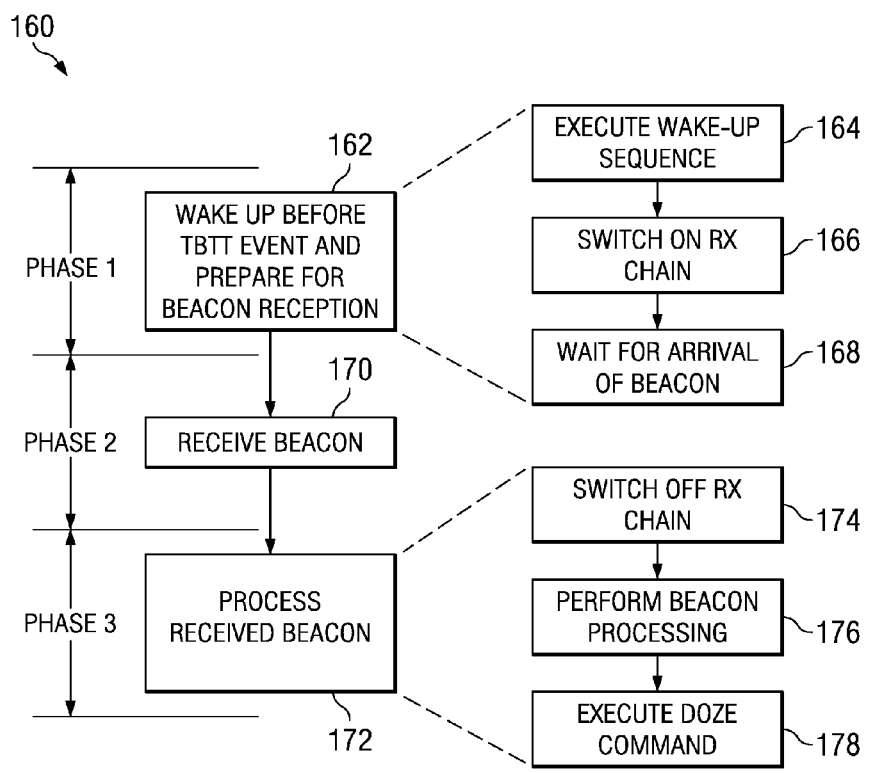
FIG. 4 is a block diagram illustrating the multi-phase process of Beacon reception in a STA.
Figure 5:
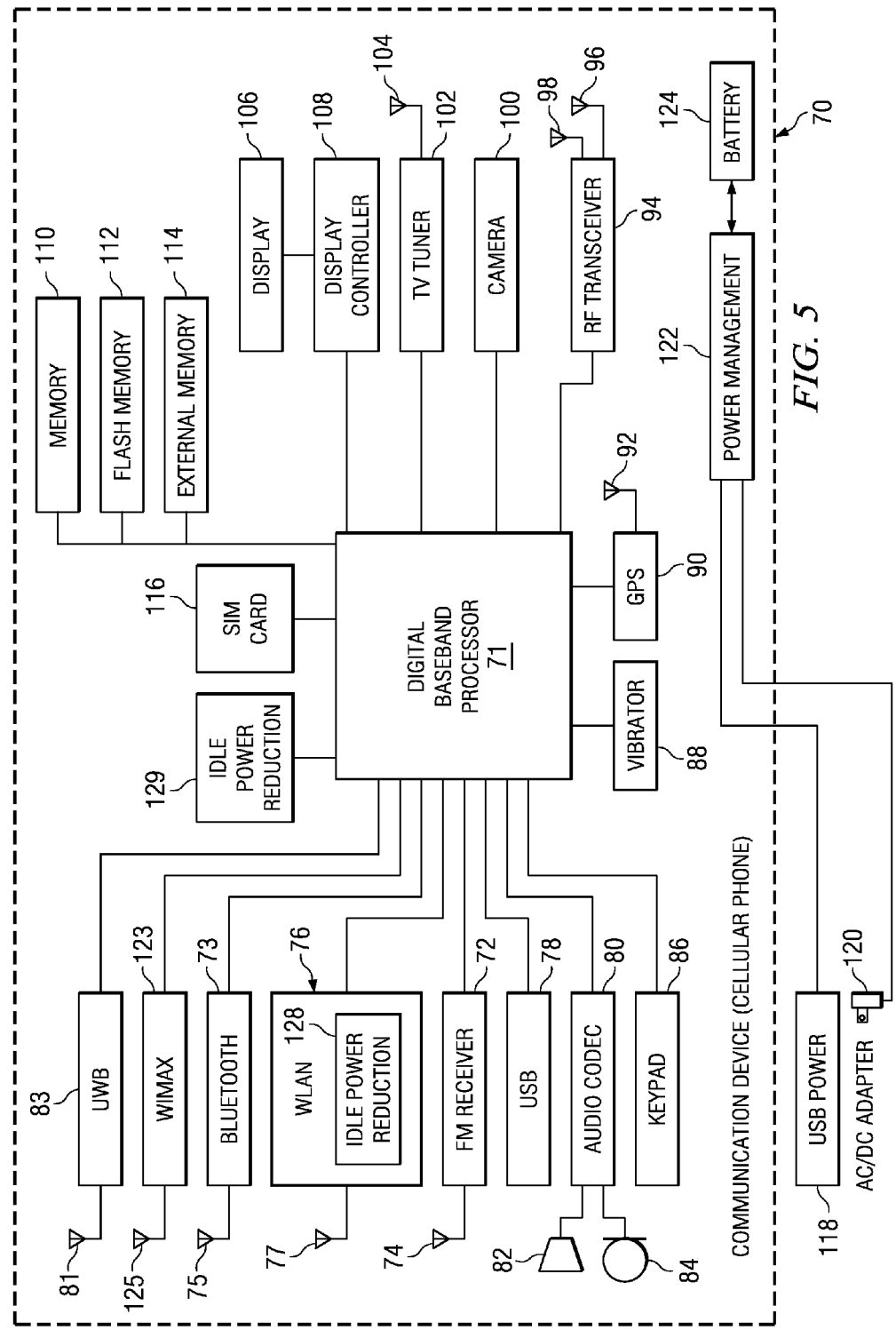
FIG. 5 is an example communication device in more detail incorporating the WLAN idle connection state power reduction mechanism of the present invention.

A simplified block diagram illustrating an example communication device incorporating the WLAN idle connection state power reduction mechanism of the present invention is shown in FIG. 3. The communication device may comprise any suitable wired or wireless device such as a multimedia player, mobile station, mobile device, cellular phone, PDA, wireless personal area network (WPAN) device, Bluetooth EDR device, etc. For illustration purposes only, the communication device Is shown as a cellular phone or smart phone. Note that this example is not intended to limit the scope of the invention as the frequency reference dither mechanism of the present invention can be implemented in a wide variety of wireless and wired communication devices.

The cellular phone, generally referenced 70, comprises a baseband processor or CPU 71 having analog and digital portions. The basic cellular link is provided by the RF transceiver 94 and related one or more antennas 96, 98, A plurality of antennas is used to provide antenna diversity which yields improved radio performance. The cell phone also comprises internal RAM and ROM memory 110, Flash memory 112 and external memory 114.

The basic cellular link is provided by the RF transceiver 94 and related one or more antennas 96, 98. A plurality of antennas is used to provide antenna diversity which yields improved radio performance. The cell phone also comprises internal RAM and ROM memory 110, Flash memory 112 and external memory 114.

Several user interface devices include microphone 84, speaker 82 and associated audio codec 80, a keypad for entering dialing digits 86, vibrator 88 for alerting a user, camera and related circuitry 100, a TV tuner 102 and associated antenna 104, display 106 and associated display controller 108 and GPS receiver 90 and associated antenna 92.

A USB interface connection 78 provides a serial link to a user's computer (e.g., PC, Mac, etc.) or other device. An FM receiver 72 and antenna 74 provide the user the ability to listen to FM broadcasts. WLAN radio and interface 76 and antenna 77 provide wireless connectivity when in a hot spot or within the range of an ad hoc, infrastructure or mesh based wireless LAN network. In accordance with the invention, the WLAN comprises the idle connection state power reduction mechanism as indicated in block 128. Alternatively, software adapted to implement the idle connection state power reduction mechanism may be as provided as a task (block 129) to be executed by the digital baseband processor 71.

Note that the idle connection state power reduction mechanism may be implemented as hardware, as software executed as a task on the baseband processor 71 or a combination of hardware and software. Implemented as a software task, the program code operative to implement the idle connection state power reduction mechanism of the present invention is stored in one or more memories 110, 112 or 114.

A Bluetooth EDR radio and Interface 73 and antenna 75 provide Bluetooth wireless connectivity when within the range of a Bluetooth wireless network. Further, the communication device 70 may also comprise a WiMAX radio and interface 123 and antenna 125. SIM card 116 provides the interface to a user's SIM card for storing user data such as address book entries, etc. The communication device 70 also comprises an Ultra Wideband (UWB) radio and interface 83 and antenna 81. The UWB radio typically comprises an MBOA-UWB based radio.

Portable power is provided by the battery 124 coupled to power management circuitry 122. External power is provided via USB power 118 or an AC/DC adapter 120 connected to the power management circuitry which is operative to manage the charging and discharging of the battery 124 and power delivery to the communication device.

Example WLAN Transceiver

Figure 6:
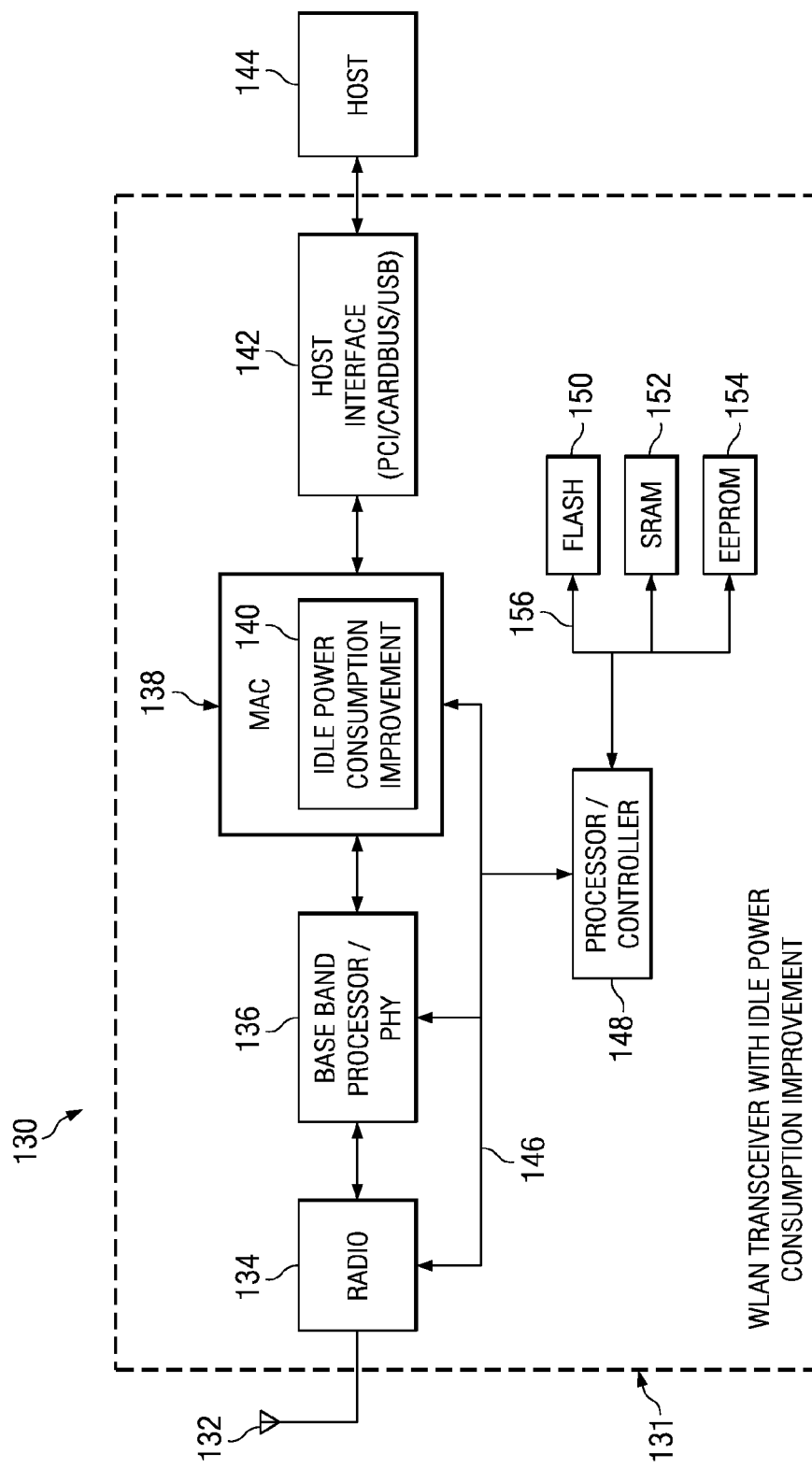
FIG. 6 is a block diagram illustrating an example WLAN transceiver incorporating the idle connection state power reduction mechanism of the present invention.

A simplified block diagram illustrating an example WLAN transceiver incorporating the idle connection state power reduction mechanism of the present invention is shown in FIG. 6. The example circuit, generally referenced 130, comprises a WLAN transceiver 131 coupled to an antenna 132 and a host 144. The WLAN transceiver 131 comprises a WLAN radio 134, baseband processor/PHY circuit 136, MAC 138, host interface 142, processor/controller 148, flash memory 150, SRAM 152 and EEPROM 154.

The host interface 142 functions to interface the WLAN to a host entity 144. The host may comprise any suitable computing device such as a PDA, laptop computer, desktop computer, handheld telecommunications device, etc. The host interface may be adapted to communicate with the host in any manner. Typically, the host interface is adapted to communicate via a standard interface including, but not limited to, PCI, CardBus, USB, SDK), SDI, etc.

The medium access controller (MAC) 138 is operative to provide Layer 2 functionality (i.e. the OSI model). The MAC handles communications and implements the protocol between the host and the PHY Layer 1 hardware. The baseband processor/PHY module 50 implements the Layer 1 functionality (OSI model). The PHY performs modulation and demodulation of data (i.e. OFDM in the case of WLAN 802.11a or 802.11g, or Barker and CCK in the case of 802.11b). In addition, the PHY also performs analog to digital conversion, digital to analog conversion, carrier sensing and handles the transmission and reception of frames. The radio module 134, coupled to antenna 132, functions to perform the radio frequency (RF) processing including upconversion from, intermediate frequency (IF), downconversion from IF, filtering and amplification, of the RF signal. Note that alternatively, the radio may perform direct conversion and in this case would not need IF conversion circuitry.

In accordance with the present invention, the WLAN idle connection state power reduction mechanism of the present invention is implemented in the MAC portion of the transceiver. Note that alternatively, the mechanism of the invention may be implemented as a task executed on the processor/controller. In this case, the programming code for implementing the mechanism may reside on either of memories 150, 152, 154 or on the processor/controller itself. Note also that the mechanism may be performed entirely in hardware, software or a combination of hardware and software. Alternatively, the mechanism may be implemented entirely in the host or a portion implemented in the host and a portion in the MAC.

The WLAN transceiver also comprises a processor/controller 148. Hash memory 150, static random access memory (SRAM) 152 and electrical erasable programmable read only memory (EEPROM) 154. Note that DRAM may be used in place of static RAM. In addition, the mesh point may not comprise any EEPROM memory. The controller 148 is operative to provide management, administration and control to the MAC, PHY and radio modules via bus 146. The controller is also in communication with the Flash. SRAM and EEPROM memories via a separate memory bus 156 or via a single bus 146 shared by ail the modules and memory devices.

Advertisement of Beacon Transmission Delay

It was found by a series of measurements taken by the inventor that the majority of access point devices delay beacon transmission beyond the time needed for the IEEE 802.11e Enhanced Distributed Channel Access (EDCA). This particular type of delay is referred to as the Beacon Transmission Delay (BTD), It is defined as the time from the creation of the Target Beacon Transmit Time (TBTT) event by the IEEE 802.11 MAC hardware timer to the time the beacon packet is forwarded to the IEEE 802.11 EDCA Channel Access function in the 802.11 MAC hardware. In accordance with the measurements taken by the inventor, the beacon transmission delay time may vary anywhere from 40 microseconds to 400 microseconds in the typical access point (AP) implementation.

If the STA had knowledge of the beacon transmission delay, it could delay wake-up until a point in time that is much closer to the actual arrival of the beacon message, thereby reducing the power consumption of the STA while in the idle connection state, and increasing standby and talk time. Therefore, in accordance with the invention, the AP is operative to measure and advertise a beacon transmission delay time in the beacon message. The beacon transmission delay time is advertised via a beacon transmission delay information element (IE). The invention provides methods for execution in both the access point and the station.

The functionality to be added to the access point implementation will now be described in more detail. The beacon transmission delay of the access point must be determined and reported to the STAs. The actual method used to determine the beacon transmission delay is not critical to the invention, illustrative examples of the methods AP manufacturers may use to determine the beacon transmission delay are described below.

Figure 7:
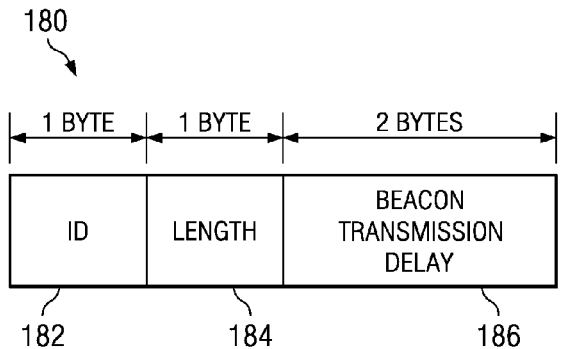
FIG. 7 is a diagram illustrating the frame format for the beacon transmission delay information element of the present invention.

A diagram illustrating the frame format for the beacon transmission delay-information element of the present invention is shown in FIG. 7. The beacon transmission delay IE, generally referenced 180, comprises a 1-byte ID field 182 which is assigned by the IEEE internet Assigned Numbers Authority (IANA), 1-byte length field 184 which is equal to two and 2-byte beacon transmission delay field 186 which comprises a value of the beacon transmission delay either measured or assessed by the AP vendor.

Figure 8:
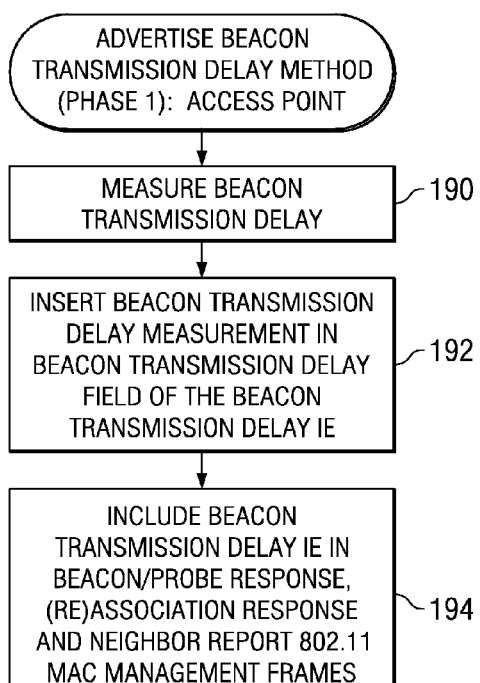
FIG. 8 is a flow diagram illustrating the method of advertising the beacon transmission delay for use on an access point.

A flow diagram illustrating the method of advertising the beacon transmission delay for use on an access point is shown in FIG. 8, First, the beacon transmission, delay (BID) is measured using any suitable method (step 190). Typically, the access point manufacturer implements, for example, the methods of FIGS. 9 and 10 to measure or assess the beacon transmission delay. Once obtained, the beacon transmission delay value is inserted into the beacon transmission delay field of the Beacon Transmission Delay Information Element (IE) (step 192). The Beacon Transmission Delay IE is included in 802.11 MAC management frames, such as Beacon/Probe Responses, (Re)Association Responses and Neighbor Reports.

As discussed above, Access Point vendors can select several methods to measure the Beacon Transmission Delay in their AP devices. Two example methods are presented below. Note that other methods of determining (via measurement or other means) the beacon transmission delay may be used without departing from the scope of the invention.

Figure 9:
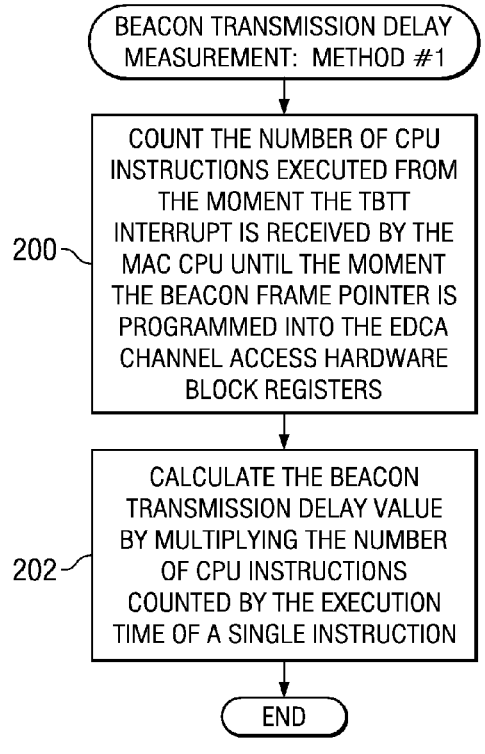
FIG. 9 is a flow diagram illustrating a first beacon transmission delay measurement method.

A flow diagram illustrating a first beacon transmission delay measurement method is shown in FIG. 9. In this first method, the minimal beacon transmission delay is assessed based on internal knowledge of the particular AP implementation, which is assumed known to the AP manufacturer. If the beacon transmission process is implemented in software, the number of CPU (i.e. processor) instructions executed from the moment the TBTT interrupt is received by the MAC CPU to the moment the Beacon frame pointer is programmed into the EDCA Channel Access hardware block registers is counted (step 200).

The number of executed CPU instructions counted is then multiplied by the execution time of a single instruction (step 202). This yields the beacon transmission, delay value which is then advertised to the STAs and other devices in the WLAN system via beacon transmission delay IEs inserted into the beacon messages.

Figure 10:
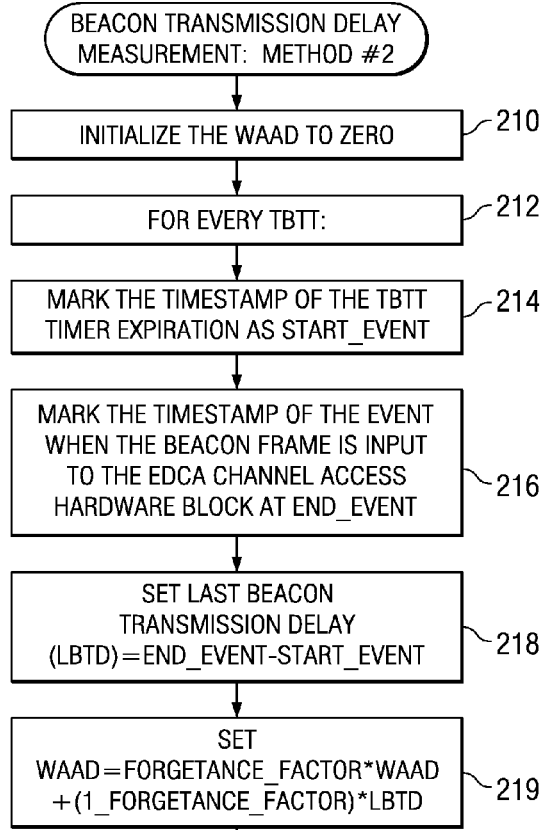
FIG. 10 is a flow diagram illustrating a second beacon transmission, delay measurement method.

A flow diagram illustrating a second beacon transmission delay measurement method is shown in FIG. 10. The second method is a Weighted Average Access Delay (WAAD) method. First, the WAAD value is set initially to zero (step 210). For every TBTT, the following process is repeated (step 212). The timestamp of the TBTT timer expiration is marked as START_EVENT (step 214). The timestamp of the event when the Beacon frame is input to the EDCA Channel Access hardware block is marked as END_EVENT (step 216). The Last Beacon Transmission Delay (LBTD) is set to the difference between END_EVENT and START_EVENT, i.e. LBTD=(END_EVENT−START_EVENT) (step 218).

The WAAD is updated in accordance with a decay or forgettance factor and the previous value for the WAAD as follows in Equation 1 (step 219).

$$\text{WAAD} = \text{Forgettance\_Factor} \times \text{WAAD} + \text{Forgettance\_Factor}) \times \text{LBTD} \quad (1)$$

where a default value for Forgettance_Factor is 0.9.

The functionality to be added to the station implementation will now be described in more detail. The beacon transmission delay measured or determined by the access point is advertised to the STAs via special information elements 180 (FIG. 7) as described supra.

Figure 11:
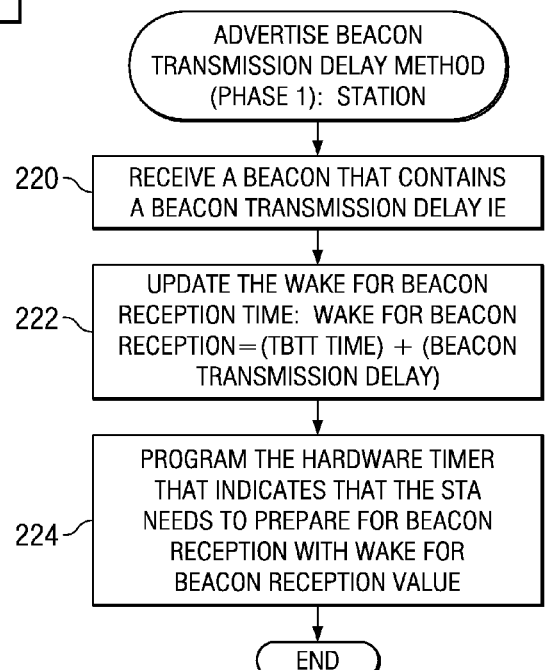
FIG. 11 is a flow diagram illustrating the method of advertising the beacon transmission delay for use on a station.

A flow diagram illustrating the method of advertising the beacon transmission delay for use on a station is shown in FIG. 11. When a STA receives a Beacon message that contains a Beacon Transmission Delay Information Element (step 220) it first extracts the Beacon Transmission Delay field value from the contents of the received IE. The STA then updates the Wake For Beacon Reception time value by adding the Beacon Transmission Delay to the TBTT time, as in Equation 2 below (step 222).

$$\text{Wake\_For\_Beacon\_Reception} = \text{TBTT\_time} + \text{Beacon\_Transmission\_Delay} \quad (2)$$

where
TBTT time is the Beacon Interval advertised by the Access Point in Beacon frames;
Beacon Transmission Delay is the value of the Beacon Transmission Delay field of the Beacon Transmission Delay Information Element;

The STA then programs (i.e. configures) the hardware timer used to indicate that the STA needs to prepare for the Beacon reception with the updated Wake For Beacon Reception value (step 224).

Reduction In Beacon Frame Reception Time

In order to enable maximum range coverage. Beacons are transmitted at low rates. The typical Beacon transmission PHY rate is 1 Mbps. The typical Beacon length measured in different environments varies from approximately 130 to 300 bytes which translates to Beacon transmission times of 1.2 milliseconds to 2.6 milliseconds. It has been found that the contents of the Beacon messages do not change significantly between consecutive Beacon transmissions. An exception to this is the TSF Information Element and TIM Information Element that do change every Beacon period.

Changes in the contents of Beacon messages usually occur in the leading 73 bytes as follows:

1. 802.11 Header: 24 bytes, the duration field typically changes.
2. Timestamp: 8 bytes, changes every Beacon message.
3. Beacon Interval: 2 bytes, does not change.
4. Capabilities Information Element: 2 bytes, does not change.
5. SSID Information Element: typically 8 bytes, does not change.
6. Rates Information Element: typically 13 bytes, does not change.
7. Direct Sequence (DS) Parameter Set Information Element: 3 bytes, does not change.
8. TIM Information Element: typical for network with 64 STAs: 13 bytes, changes every Beacon.

The information elements that follow the leading 73 bytes of the Beacon message change infrequently, if at all. Therefore, a STA could abort the reception of the Beacon if it was able to know that it received all the information in the Beacon transmission that changed from the previous Beacon transmission received from the Access Point, thereby reducing power consumption.

Figure 12:
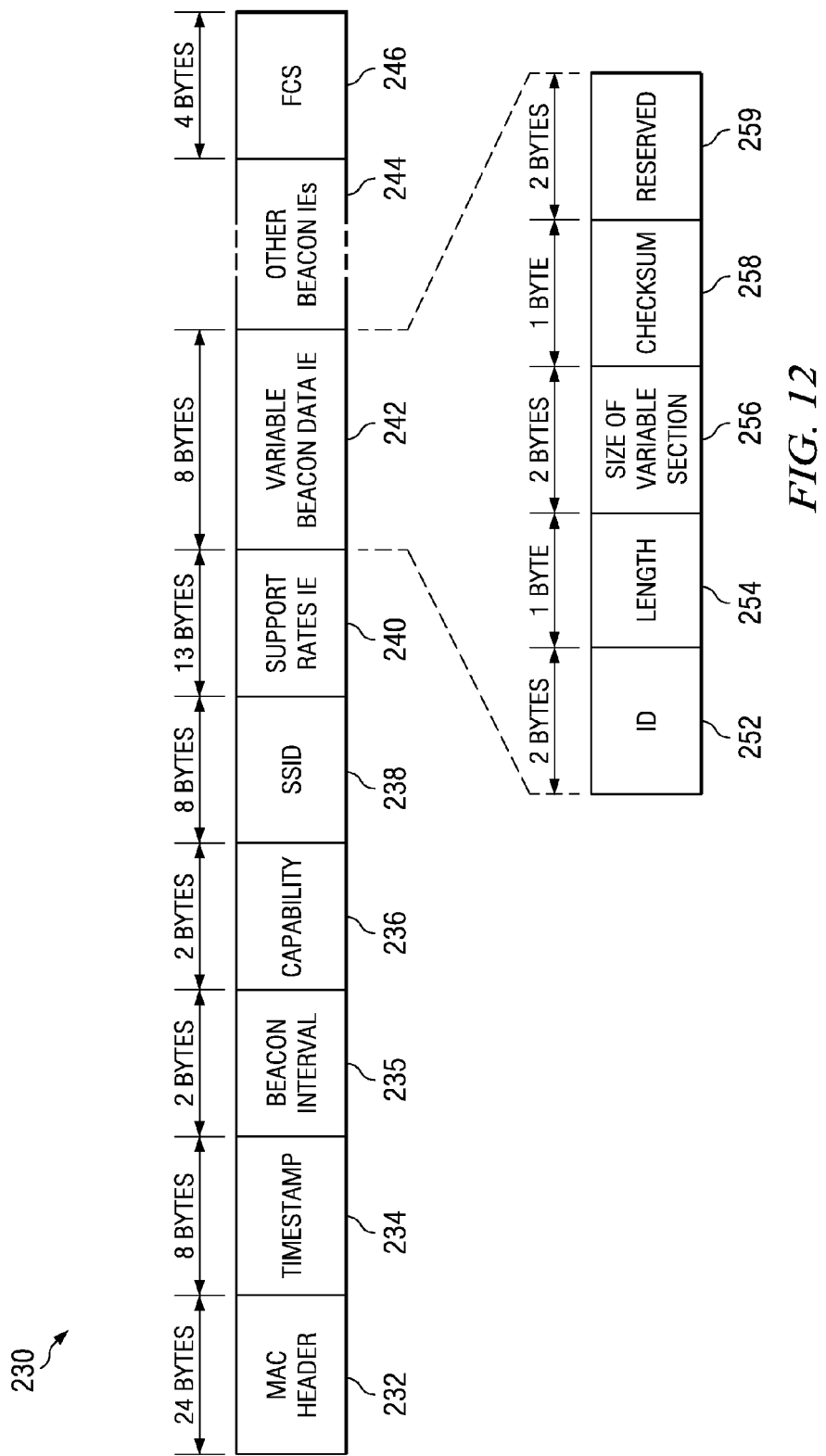
FIG. 12 is a diagram illustrating the frame format for an example beacon having a variable beacon data information element of the present invention.

Thus, in accordance with the present invention, a Variable Beacon Data Information Element is defined that is transmitted in the Beacon message by an Access Point and received and processed by the stations. A diagram illustrating the frame format for an example beacon having a variable beacon data information element of the present invention is shown in FIG. 12.

The Variable Beacon Data Information Element, generally referenced 242, is transmitted after the Supported Rates Information Element and before the DS Parameter Set Information Element in the Beacon message, generally referenced 230. The following is a description of the frame format and fields of the Beacon message and the Variable Beacon Data Information Element, generally referenced 230. The Beacon message 230 comprises The Beacon message 230 comprises a 24-byte 802.11 header 232, 8-byte timestamp 234, 2-byte Beacon interval field 235, 2-byte capabilities Information Element 236, 8-byte SSID Information Element, 13-byte Supported Rates Information Element 240, 8-byte Variable Beacon Data Information Element 242, other Information Elements 244 and a 4-byte Frame Check Sequence (PCS) field. The Beacon also includes a 3-byte Direct Sequence (DS) Parameter Set Information Element and 13-byte TIM Information Element The Variable Beacon. Data Information Element 242 comprises & 2-byte ID field 252, 1-byte length field, 2-byte size Held indicating the size of the variable section of the Beacon message, 1-byte checksum calculated over the variable section of the Beacon message only and a 2-byte reserved field 259. Note that the ID field 252 value is equal to 2 thus overlaying the Frequency Hopping Parameter Set Information Element structure. This is not critical as the Frequency Hopping Parameter Set Information Element is not in use in the Direct Spread Sequence (DSSS) (i.e. 802.11 DS), High Rate DSSS (i.e. 802.11b), OFDM (i.e. 802.11a), Extended Rate PHY (ERF) (i.e. 802.11g) and High Throughput (HT) (i.e. 802.1 in) physical layers and therefore can be reused for systems deploying PHYs modified to implement the mechanisms of the present invention.

The length field 254 is set to 5. The Size Of Variable Section field 256 indicates size of the Beacon frame contents that changed from the previous Beacon transmission. The checksum field 258 is used to validate integrity of received Beacon contents starting from the first byte and continuing to the length of Size Of Variable Section. The reserved field 259 is set to zero.

Figure 13:
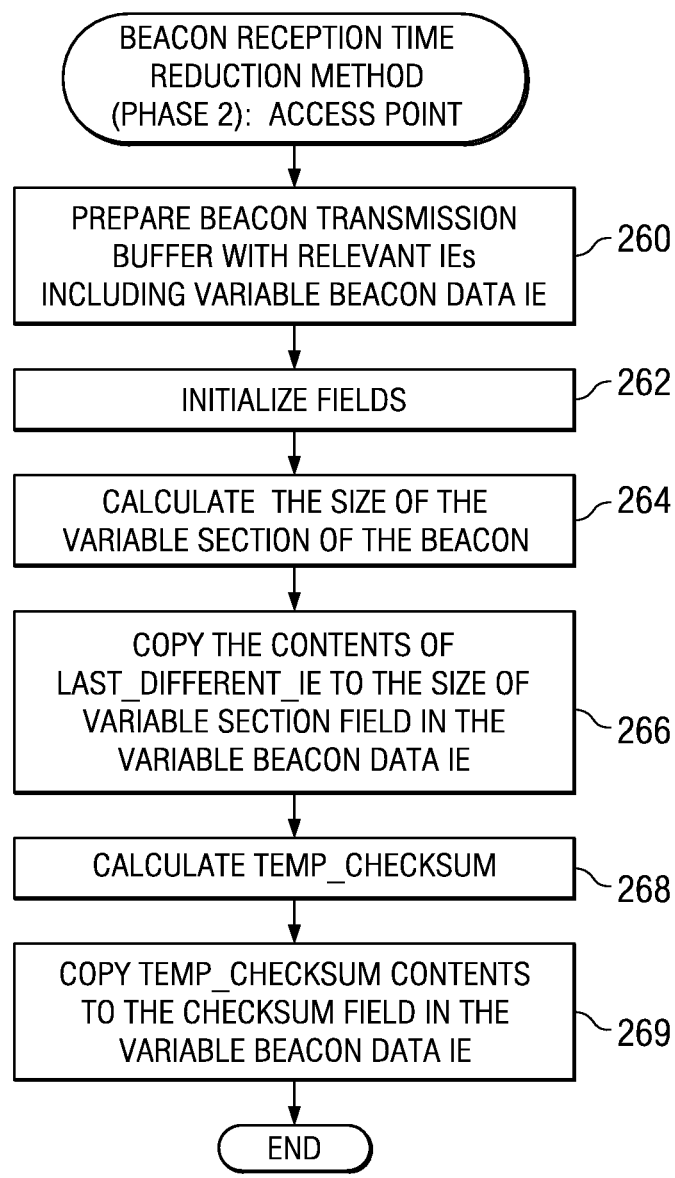
FIG. 13 is a flow diagram Illustrating the method of beacon reception time reduction for use on an access point.

The functionality to be added to the implementation of the Access Point will now be described. A flow diagram illustrating the method of beacon reception time reduction for use on an access point is shown in FIG. 13. This method is intended to be implemented by the Access Point during its preparation of the Beacon for transmission.

First, the Access Point prepares a Beacon transmission buffer with ail relevant Information Elements, including the Variable Beacon Data Information Element, that are to be transmitted in the Beacon message (step 260). The following fields are initialized to zero: the duration field in the frame header, the TSF IE and the checksum field of Variable Beacon Data Information Element (step 262). The Access Point then calculates the size of variable section in the following manner (step 264): It first compares the contents of the current Beacon in the Beacon transmission buffer with the contents of the most recently transmitted Beacon. The comparison starts immediately after the Variable Beacon Data Information Element and continues until the end of the Beacon message. A Last_Different_IE variable is set with the offset of the Information Element immediately following the last Information Element that differs between the two Beacons. The offset is calculated starting from the first byte of the Beacon frame stored in the Beacon transmission buffer.

The contents of the Last_Different_IE variable is copied to the Size of Variable Section field in the Variable Beacon Data Information Element (step 266). The checksum value on die variable portion of the Beacon, called the Temp_Checksum, is then calculated in accordance with the following algorithm (step 268): The Temp_Checksum variable is initialized to the hex value of 0xAB and the variable I is initialized to 0. For I=0 to Last_Different_IE. Temp_Checksum=Temp_Checksum XOR (the contents of the byte read from the Beacon transmission buffer at offset I). The contents of Temp_Checksum are copied to the checksum field 258 (FIG. 12) in the Variable Beacon Data Information Element 242 (step 269). The Access Point then transmits the prepared Beacon message according to the rules defined in the IEEE 802.11 standard.

Figure 14:
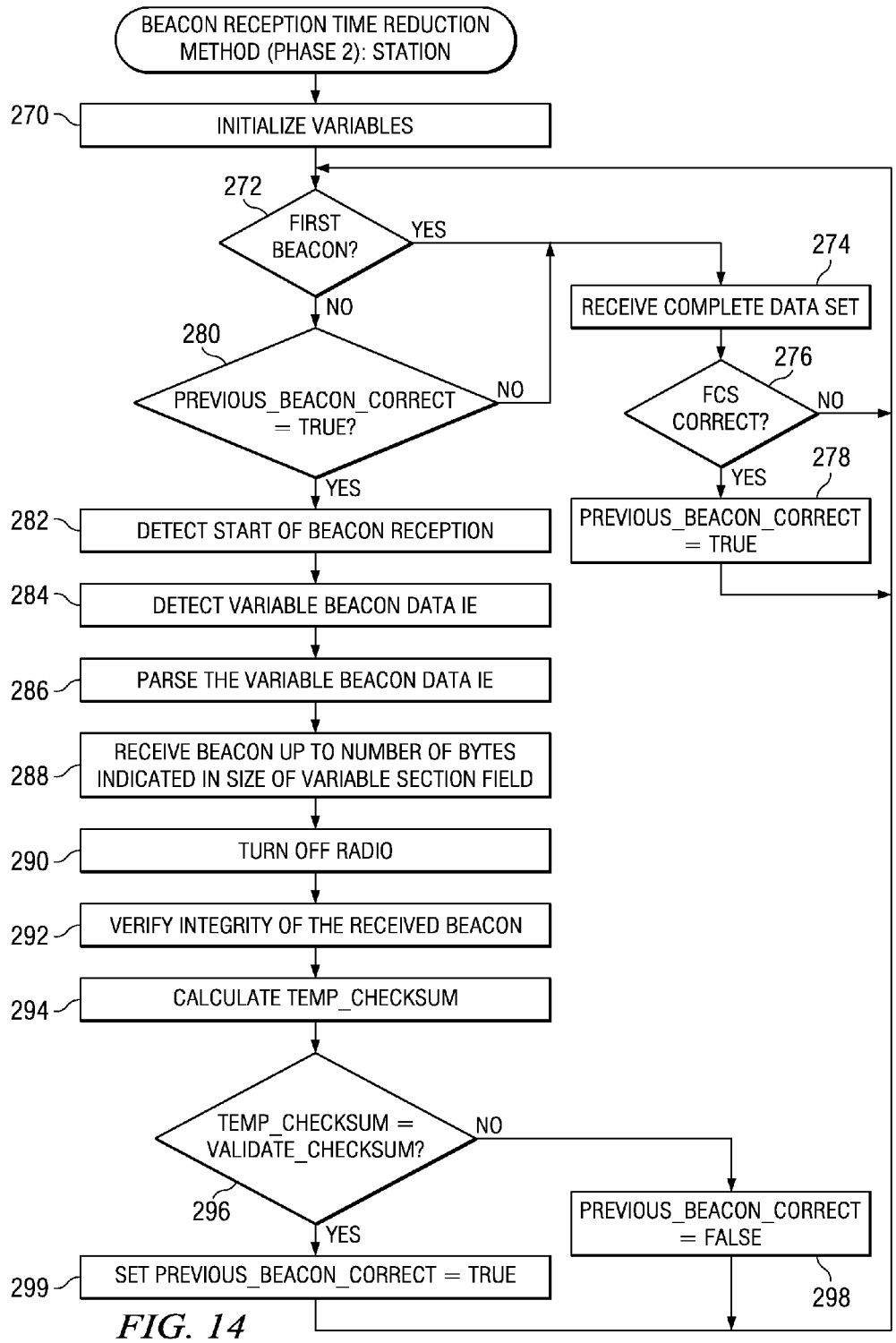
FIG. 14 is a flow diagram illustrating the method of beacon reception time reduction for use on an access point.

The following functionality is added to the implementation of the Stations in the WLAN system. A flow diagram illustrating the method of beacon reception time reduction for use on an access point is shown in FIG. 14. This method is intended to be implemented by the STAs in the WLAN network. The STA maintains a logical variable (or flag) Previous_Beacon_Correct which is used to indicate whether the previously received Beacon was received correctly. Initially, the Previous_Beacon_Correct variable is set to FALSE (step 270). The STA waits for receipt of a beacon. If the Beacon received by the STA is the first Beacon after joining the BSS (step 272), then it receives the complete data set in the Beacon message (step 274). If the Frame Check Sequence (FCS) of the Beacon is correct (step 276) then Previous_Beacon_Correct is set to TRUE (step 278) and the method returns to wait for the next Beacon.

If the Beacon received is not the first Beacon after joining the BSS (step 272), the STA implement the following process of Beacon reception for subsequently received Beacons. It is first checked whether Previous_Beacon_Correct is TRUE (step 280). If not then this means that the previous Beacon was not received correctly and the entire Beacon message should be received. The method continues with step 274.

If Previous_Beacon_Correct is TRUE (step 280), then only the variable portion of the Beacon needs to be received as follows. The start of Beacon reception is detected using any suitable existing mechanism as is known in the art (step 282). This can be achieved by detecting the frame type of the Beacon and the BSSID STA it is associated with. The STA begins storing received Beacon data in a Beacon received data buffer. The Variable Beacon Data Information Element is then detected via its unique ID (step 284). The contents of the Variable Beacon Data information Element is parsed and the Size Of Variable Section field is read (step 286).

In accordance with the present invention. Beacon reception Is stopped after the number of bytes indicated in the Size Of Variable Section field is received (step 288). Thus, the STA need not receive the entire Beacon message beyond the number of bytes called for in the Size Of Variable Section field. Once the variable portion of data is received, the STA turns off the radio thereby significantly reducing power consumption (step 290).

The integrity of the received Beacon is then verified in the following manner (step 292). The contents of the checksum field from the Variable Beacon Data Information Element is copied to a Validate_Checksum variable. The following fields of the Beacon data buffer are initialized to zero: the duration field in the Frame Header, TSF IE and the Checksum field of Variable Beacon Data Information Element. The contents of the Variable Section field in the Variable Beacon Data Information Element is copied to the Last_Different—IE variable.

The Temp_Checksum value is then calculated according to the following algorithm (step 294): The Temp_Checksum variable is initialized to the hex value of 0xAB and the variable I is initialized to 0. For I=0 to Last_Different_IE, Temp_Checksum=Temp_Checksum XOR (the contents of the byte read from the Beacon receive buffer at offset I).

The contents of Temp_Checksum are then compared to the contents of the Validate_Cheeksum variable (step 296). If the values are equal then the Beacon data is considered to have been correctly received and Previous_Beacon_Correct is set to TRUE (step 299). Otherwise, the Beacon data is considered to have been received incorrectly and Previous_Beacon_Correct is set to FALSE (step 298). The method returns to step 272.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method for use in a station in a wireless local area network (WLAN) system, said method comprising the steps of:
   receiving a message containing beacon transmission delay information transmitted by an access point; and
   calculating a wake for beacon time value as a sum of said beacon transmission delay and a Target Beacon Transmission Time (TBTT) advertised by said access point.

2. The method according to claim 1, wherein said beacon transmission delay information is received in a Beacon Transmission Delay Information Element (IE).

3. The method according to claim 1, further comprising the step of calculating a new wake for beacon time value as a function of said beacon transmission delay information and a beacon interval advertised by said access point.

4. The method according to claim 1, further comprising the step of programming a hardware wake-up timer with said updated wake for beacon reception time value.

5. The method according to claim 1, wherein said message comprises a message from the group consisting of Beacon, Probe response, Association Response, Re-association Response and Neighbor report.

6. A mobile communication device, comprising:
   a cellular radio;
   a WLAN radio;
   a processor communicatively coupled to said WLAN radio and said cellular radio, said processor operative to:
      receive a message containing beacon transmission delay information transmitted by an access point; and
      adjust a wake for beacon reception time value by calculating said wake for beacon reception time value as a sum of said beacon transmission delay and a Target Beacon Transmission Time (TBTT) advertised by said access point.

7. The mobile communications device according to claim 6, wherein said beacon transmission delay is transmitted in a beacon transmission delay information element.

8. The mobile communications device according to claim 6, wherein said processor is further operative to program a hardware wake-up timer with said adjusted wake for beacon reception time value.

9. An apparatus, comprising:
   circuitry for receiving a message containing beacon transmission delay information transmitted by a wireless local area network (WLAN) access point; and
   circuitry for updating a wake for beacon reception time value in accordance with said beacon transmission delay information, wherein said updating comprises the calculating a wake for beacon time value as a sum of said beacon transmission delay and a Target Beacon Transmission Time (TBTT) advertised by said WLAN access point.

10. The apparatus of claim 9, wherein said beacon transmission delay information is received in a Beacon Transmission Delay Information Element (IE).

11. The apparatus of claim 9, further comprising circuitry for programming a hardware wake-up timer with said updated wake for beacon reception time value.

12. The apparatus of claim 9, wherein said message comprises a message from the group consisting of Beacon, Probe response, Association Response, Re-association Response and Neighbor report.

13. A method, comprising:
   receiving a message containing beacon transmission delay information transmitted by an Wireless Local Area Network (WLAN) access point; and
   adjusting a wake for beacon reception time value in an apparatus enabled to receive the message in accordance with said beacon transmission delay information, wherein said wake for beacon reception time value is adjustable by calculating said wake for beacon time value as a sum of said beacon transmission delay and a Target Beacon Transmission Time (TBTT) advertised by said WLAN access point.

14. The method of claim 13, wherein said measured beacon transmission delay is transmitted in a beacon transmission delay information element.

15. The method according to claim 13, further comprising programming a hardware wake-up timer in a processor with said adjusted wake for beacon reception time value.

* * * * *